United States Patent [19]

Greenwood

[11] 4,231,494
[45] Nov. 4, 1980

[54] SYRINGE ADAPTOR ASSEMBLY

[76] Inventor: David L. Greenwood, 3118 Sandy La., Glenview, Ill. 60025

[21] Appl. No.: 22,698

[22] Filed: Mar. 22, 1979

[51] Int. Cl.³ .................. B65D 83/14; B67D 5/54
[52] U.S. Cl. .................... 222/325; 222/179; 222/373; 222/389; 222/394; 403/348; 285/401
[58] Field of Search .............. 222/1, 179, 325–327, 222/373, 389, 394, 399, 395; 285/338, 401; 128/214 F, 225, 229; 403/348

[56] References Cited

U.S. PATENT DOCUMENTS

| | | | |
|---|---|---|---|
| 3,258,176 | 6/1966 | Raczynski | 222/399 X |
| 3,272,393 | 9/1966 | Roeser | 222/179 |
| 3,279,660 | 10/1966 | Collar | 222/389 X |

Primary Examiner—Charles A. Marmor

Attorney, Agent, or Firm—Dressler, Goldsmith, Shore, Sutker & Milnamow, Ltd.

[57] ABSTRACT

A connector is provided for attachment of a syringe to a dispenser adapted to provide measured quantities of pressured gas to the syringe to displace the contents of the syringe in measured drops. The connector includes a flexible conduit attached at one end to the dispenser and attached at its opposite end to the filling end of a syringe while gripping the oppositely disposed projections, or "ears", of the syringe. There is an externally threaded tube at the syringe end of the flexible conduit, terminated by a stopper member which has a cylindrical end portion sized to fit loosely within the filling end of the syringe, which end portion is joined to a sealing flange. The sealing flange abuts the flat surface at the filling end of the syringe while the syringe "ears" are retained within oppositely disposed channels after a knurled ring on the externally threaded tubular member is rotated.

3 Claims, 3 Drawing Figures

U.S. Patent
Nov. 4, 1980
4,231,494
FIG. 1
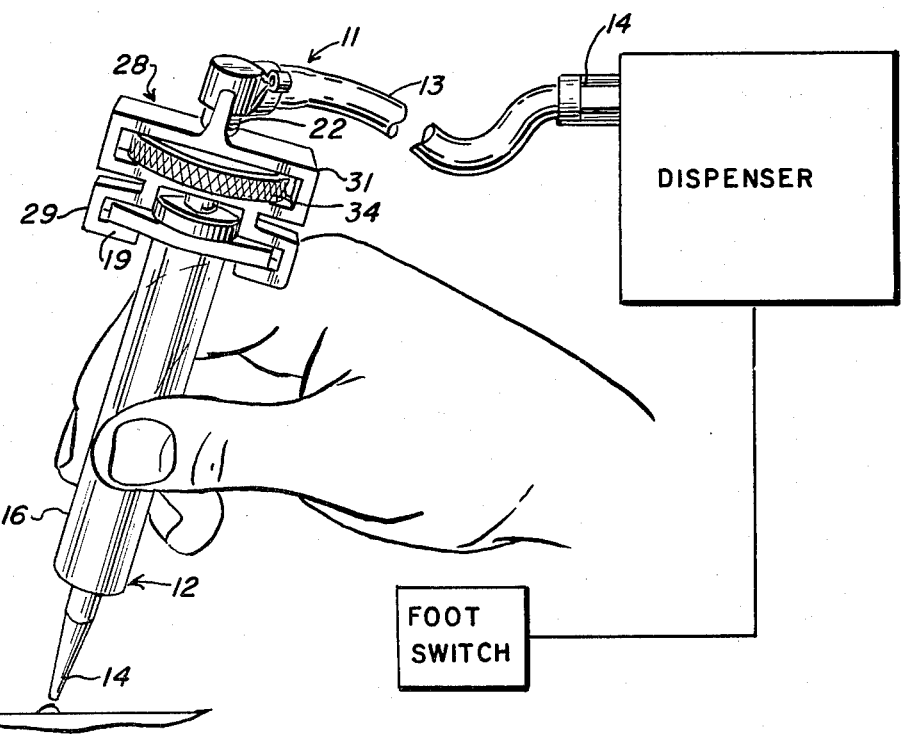
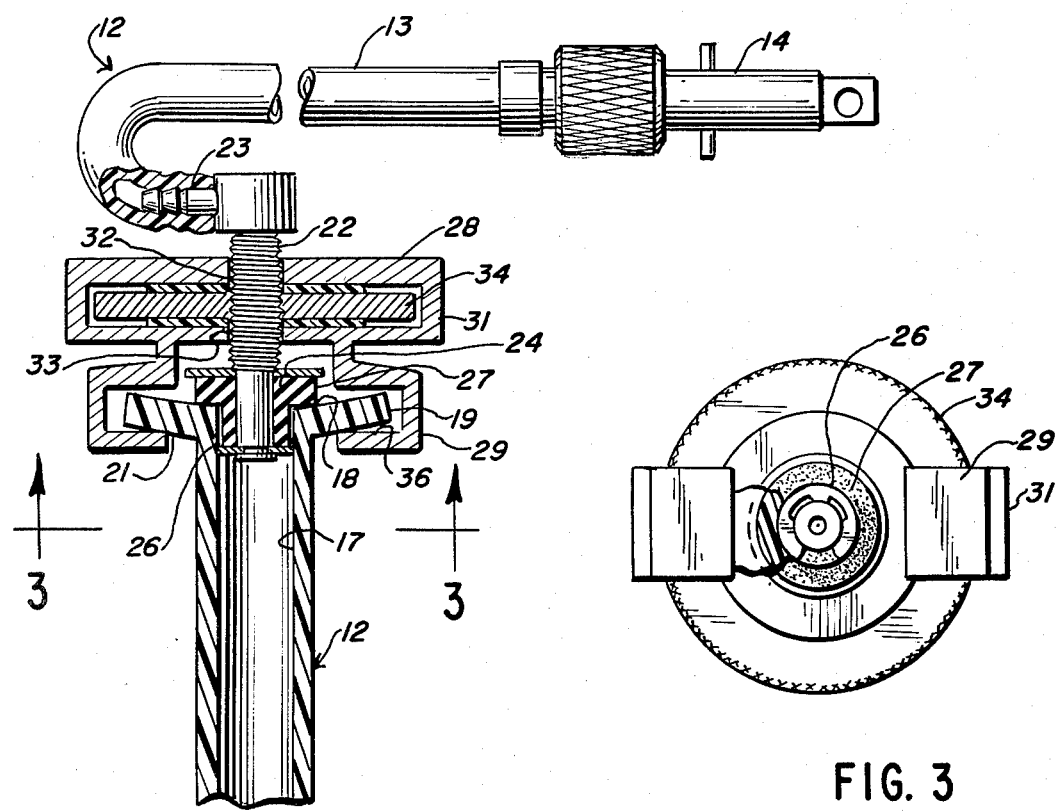
FIG. 2
FIG. 3

4,231,494

SYRINGE ADAPTOR ASSEMBLY

DESCRIPTION

BACKGROUND OF THE INVENTION

In certain manufacturing processes it is necessary to deposit small quantities of a liquid at specific locations, with accuracy being required both for the amount of liquid deposited and the location of the deposit. It is sometimes desired in a manufacturing process, for example, to deposit microdots of an adhesive at particular locations in the assembly of a small electronic device.

For the aforementioned purpose, dispensing syringes are used which are similar to medical hypodermic syringes and which have, at their dispensing ends, hollow needles of a desired internal diameter. When the syringes are used the manner of medical syringes with expulsion of liquid through the hand propulsion of a plunger within the syringe, it is difficult to obtain a uniformity of size in the deposited drops of liquid, particularly when the operator utilizes the syringe repeatedly for several hours on a production line and begins to show signs of fatigue. To deal with this problem, dispensers have been developed which replace the conventional syringe plunger and which expel liquid from the syringe by displacing it through the introduction of controlled charges or "shots" of pressurized gas, usually air. The dispenser is usually actuated by a foot switch, each switch contact injecting a measured microquantity of pressurized gas into the syringe and causing a measured microquantity of liquid to be expelled therefrom.

The connection between the dispenser and the syringe must be gas-tight. Conventionally, the connection comprises a flexible tube affixed at one of its ends to the dispenser and affixed at its opposite end to a tubular stopper member.

The tubular stopper member has a cylindrical portion at one end which has an outer diameter somewhat smaller than the inner diameter of the syringe at its end opposite the needle end. At a midpoint in the outer surface of the cylindrical portion there is an annular groove containing a resilient O-ring dimentioned to provide a gas-tight fit between the tubular stopper member and the inner surface of the syringe.

A flange on said tubular member terminates its cylindrical end portion and provides a limit to its insertion into the open end of the syringe; and oppositely disposed channels at opposite sides of said flange are designed to receive and hold oppositely disposed projections or "ears" at the open end of the syringe.

A suitable gas-tight fit of the tubular stopper member to the open end of the syringe requires fairly close tolerances in dimensioning of the stopper member outer diameter and fairly close tolerances in the positioning of the channels which hold the "ears" of the syringe. Syringes made by different manufacturers with the same capacity differ from each other with respect to the internal diameters of the syringe barrels and with respect to the thickness of the syringe "ears". As a result, a connector, suitable for attaching a syringe of a certain size of one manufacturer to a dispenser, becomes unsuitable when a syringe of another manufacture is used.

SUMMARY OF THE INVENTION

In accordance with the present invention, there is provided a connector for attachment of a syringe to a dispenser adapted to provide measured quantities of pressured gas to said syringe to displace the contents of said syringe in measured drops, said syringe having a filling end having at least two oppositely disposed external flanged projections and a dispensing end having a small aperture, said connector comprising a flexible conduit having a dispenser end and a syringe end, means at said dispenser end for attachment of said conduit to said dispenser, an externally threaded tubular member having a flexible conduit end and a syringe end and connected at said flexible conduit end to said syringe end of said flexible conduit, a syringe retainer member having (1) an aperture loosely fitted about said externally threaded tubular member, (2) oppositely disposed channels for engaging the external flanged projections on said syringe, and (3) a stopper member affixed externally to the syringe end of said externally threaded tubular member, a knurled ring having an internally threaded aperture threadingly engaged upon said externally threaded tubular member at a portion thereof between said dispenser end and said syringe end, said stopper member having a cylindrical end portion sized to fit loosely within said filling end of said syringe and a sealing flange attached to said cylindrical end portion, said stopper member being movable relative to said retainer member upon rotation of said knurled ring whereby said sealing flange may be moved into and out of sealing engagement with the filling end of said syringe.

The instant invention shifts the gas-tight seal from the cylindrical inner surface of the syringe barrel to the flat surface at the filling, or open, end of the syringe and provides adjustability for the thickness of the syringe ears which are held tightly in the channels when the connection is tightened by rotation of the knurled know to make the gas-tight seal.

In making the connection between the syringe and the connector, the tubular stopper member is inserted into the open end of the syringe while the channels are at right angles to the syringe ears and then the syringe, or the connector end, is rotated to bring the syringe ears loosely into the channels. The knurled knob is then rotated until the surfaces of the ears closest to the dispensing end of the syringe abut the facing channel surfaces and the filling end of the syringe is in sealing abutment with the sealing flange.

BRIEF DESCRIPTION OF THE DRAWINGS

The invention is best understood from the drawings in which:

FIG. 1 is a perspective of the connector, as it appears in use,

FIG. 2 is an elevation, partly in cross section of the connector, and

FIG. 3 is a cross section at plane 3—3 of FIG. 2, with the syringe eliminated for clarity.

DETAILED DESCRIPTION OF THE INVENTION

As shown in FIGS. 1 and 2, connector 11 serves to provide a gas-tight connection between syringe 12 and the dispenser, shown schematically and identified by legend in FIG. 1. The dispenser is actuated by a foot switch, shown schematically and identified by legend in FIG. 1.

Connector 11 includes flexible tube, or conduit, 13 of desired length to reach from the dispenser to the work piece to which the syringe tip is to be applied. Attachment 14 is affixed to the dispenser end of the flexible tube and fits into an aperture in the dispenser to provide a gas-tight connection at the dispenser.

The syringe has a dispensing end 16 having a small aperture which may be a molded aperture or may be the aperture of a hollow hypodermic needle attached to the molded tip of the syringe.

Barrel 16 of the syringe has an inner cylindrical surface 17 dimensioned to a close tolerance.

At the filling, or open, end of the syringe there is a flat surface 18 terminating the cylindrical syringe wall and extending to form one major surface of each of the projections 19, or "ears", which are oppositely disposed about the circumference of the syringe at its open end. The opposite major face 21 of each projection is the face which, as described below, abuts an inner surface of the channel of the connector when the connection is made and tightened.

Externally threaded tubular member 22 is in open communication with flexible conduit, or tube, 13 at its end closest to the syringe through side tube 23 at one end thereof. Stopper member 24 is affixed to the exterior of externally threaded tubular member 22 at the opposite end thereof and on an unthreaded exterior thereof. The stopper member comprises cylindrical end member 26 and sealing flange 27. The diameter of the cylindrical end member is smaller than the inner diameter of the syringe barrel so that the end member can be easily inserted into the filling end of the syringe and fits loosely therein.

Syringe retainer member 28 comprises oppositely disposed channels 29 for retaining syringe projections 19 and collar 31, having centrally located apertures 32 and 33, slightly larger than the external diameter of externally threaded tubular member 22 to permit movement of the syringe retainer member in an axial direction up or down the length of externally threaded tubular member 22.

Knurled ring 34 is located within collar 31 and has a centrally located, internally threaded aperture which engages the externally threaded tubular member so that rotation of the knurled ring in one direction moves the knurled ring and the syringe retainer member downwardly toward the stopper end of the externally threaded tubular member and rotation in the opposite direction moves them upwardly away from the stopper end.

To provide a gas-tight connection between a syringe and the connection of this invention, the cylindrical end member of the stopper is inserted into the filling end of the syringe while the syringe is held with its flanged projections out of the plane of syringe retainer member. The syringe is then rotated so that its flanged projections fit loosely within channels 29; and knurled ring 34 is then rotated until surface 18 on one side of the flanged projections abuts sealing flange 27 and the opposite major face 21 abuts surfaces 36 of channels 29.

Since sealing is effected between flat surface 18 and the flat surface of sealing flange 37, the fit of cylindrical end member within the filling end of the syringe is a loose one and is not critical. Thus, substantial variations in syringe barrel inside diameters may be tolerated; and the connector may be used with syringes of different makers despite lack of standardization in syringe dimensions.

The invention has been described with respect to a preferred embodiment thereof. It will be understood by those skilled in the art that modifications and variations may be made without departing from the essence of this invention.

What is claimed is:

1. A connector for attachment of a syringe to a dispenser adapted to provide measured quantities of pressured gas to said syringe to displace the contents of said syringe in measured drops, said syringe having a filling end having at least two oppositely disposed external flanged projections and a dispensing end having a small aperture, said connector comprising a flexible conduit having a dispenser end and a syringe end, means at said dispenser end for attachment of said conduit to said dispenser, an externally threaded tubular member having a flexible conduit end and a syringe end and connected at said flexible conduit end to said syringe end of said flexible conduit, a syringe retainer member having (1) a collar having centrally disposed apertures loosely fitted about said externally threaded tubular member, (2) oppositely disposed channels for engaging the external flanged projections on said syringe, and (3) a stopper member affixed externally to the syringe end of said externally threaded tubular member, a knurled ring within said collar having an internally threaded aperture threadingly engaged upon said externally threaded tubular member at a portion thereof between said dispenser end and said syringe end, said stopper member having a cylindrical end portion sized to fit loosely within said filling end of said syringe and a sealing flange attached to said cylindrical end portion, said stopper member being movable relative to said retainer member upon rotation of said knurled ring whereby said sealing flange may be moved into and out of sealing engagement with the filling end of said syringe.

2. The connector of claim 1 wherein said syringe retainer member has two oppositely disposed channels for engaging the external flanged projections on said syringe.

3. The method of attaching a syringe to the connector of claim 1 which comprises aligning a syringe having oppositely disposed projections at its filling end so that its projections are out of the plane of the channels of the syringe retainer member, inserting the cylindrical end member of said connector into said filling end of said syringe, rotating said syringe about its axis to bring said projections within said channels, rotating the knurled ring of said connector until the upper surface of said syringe abuts the sealing flange of said connector and the under surfaces of said projections abut the inner surfaces of said channels.

* * * * *